US011086845B1

(12) United States Patent
Shah et al.

(10) Patent No.: US 11,086,845 B1
(45) Date of Patent: Aug. 10, 2021

(54) TECHNIQUES FOR DATABASE VERSIONING

(71) Applicant: Facebook, Inc., Menlo Park, CA (US)

(72) Inventors: Rushin Shah, Menlo Park, CA (US); Anuj Kumar, Menlo Park, CA (US); Ted Li, Menlo Park, CA (US); Wei Chen, Menlo Park, CA (US); Shusen Liu, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 249 days.

(21) Appl. No.: 16/236,369

(22) Filed: Dec. 29, 2018

(51) Int. Cl.
*G06F 16/23* (2019.01)
*G06F 16/22* (2019.01)
*G06F 16/21* (2019.01)
*G06N 20/00* (2019.01)

(52) U.S. Cl.
CPC ........ *G06F 16/2365* (2019.01); *G06F 16/219* (2019.01); *G06F 16/2282* (2019.01); *G06F 16/2379* (2019.01); *G06N 20/00* (2019.01)

(58) Field of Classification Search
CPC ............... G06F 16/1873; G06F 16/182; G06F 16/2365; G06F 8/71; G06F 16/273; G06F 16/219; G06F 16/2379
USPC ........................................ 707/602, 703, 714
See application file for complete search history.

(56) References Cited

U.S. PATENT DOCUMENTS

| | | | | |
|---|---|---|---|---|
| 6,598,059 | B1 * | 7/2003 | Vasudevan | G06F 16/219 |
| 2015/0088815 | A1 * | 3/2015 | Billapati | G06F 16/21 |
| | | | | 707/609 |
| 2016/0092526 | A1 * | 3/2016 | Kothari | G06F 16/219 |
| | | | | 707/602 |
| 2017/0169370 | A1 * | 6/2017 | Cornilescu | G06F 8/71 |
| 2017/0277743 | A1 * | 9/2017 | Jain | G06F 16/2336 |
| 2019/0129704 | A1 * | 5/2019 | Beard | G06F 8/65 |
| 2019/0129894 | A1 * | 5/2019 | Peng | G06F 16/2379 |
| 2019/0325055 | A1 * | 10/2019 | Lee | G06F 16/1734 |
| 2020/0175106 | A1 * | 6/2020 | Biddle | G06N 20/00 |
| 2020/0210170 | A1 * | 7/2020 | Johnson | H04L 9/3239 |

* cited by examiner

*Primary Examiner* — Dangelino N Gortayo
(74) *Attorney, Agent, or Firm* — Kacvinsky Daisak Bluni PLLC

(57) ABSTRACT

Techniques for database versioning are described. In one embodiment, an apparatus may comprise a database change management component operative to compare a developer table to a reference table to determine a database change set, wherein both the developer table and the reference table are based on a target table; a database conflict management component operative to compare the database change set to the target table to determine a conflicting change set; and a user interface component operative to display the conflicting change set where the conflicting change set comprises one or more conflicting changes; and indicate a conflict-free change set where the conflicting change set is empty. Other embodiments are described and claimed.

20 Claims, 11 Drawing Sheets

600

Compare a developer table to a reference table to determine a database change set, wherein both the developer table and the reference table are based on a target table.
*602*

Compare the database change set to the target table to determine a conflicting change set.
*604*

Display the conflicting change set where the conflicting change set comprises one or more conflicting changes.
*606*

Indicate a conflict-free change set where the conflicting change set is empty.
*608*

*FIG. 6*

TECHNIQUES FOR DATABASE VERSIONING

BACKGROUND

Machine learning systems may operate on data sets. The machine learning systems analyze the data sets to generate machine learning models. These machine learning models are used to process additional data related to the subject of the data sets. The data sets used to generate the machine learning models may be updated: data in the data sets may be added, removed, or otherwise modified. The machine learning models may then be regenerated based on the updated data sets. This process may be performed multiple times.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for database versioning. Some embodiments are particularly directed to techniques for database versioning for machine learning systems. In one embodiment, for example, an apparatus may comprise a database change management component operative to compare a developer table to a reference table to determine a database change set, wherein both the developer table and the reference table are based on a target table; a database conflict management component operative to compare the database change set to the target table to determine a conflicting change set; and a user interface component operative to display the conflicting change set where the conflicting change set comprises one or more conflicting changes; and indicate a conflict-free change set where the conflicting change set is empty. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a logic flow for the system of FIG. 1.

DETAILED DESCRIPTION

Figure 1:
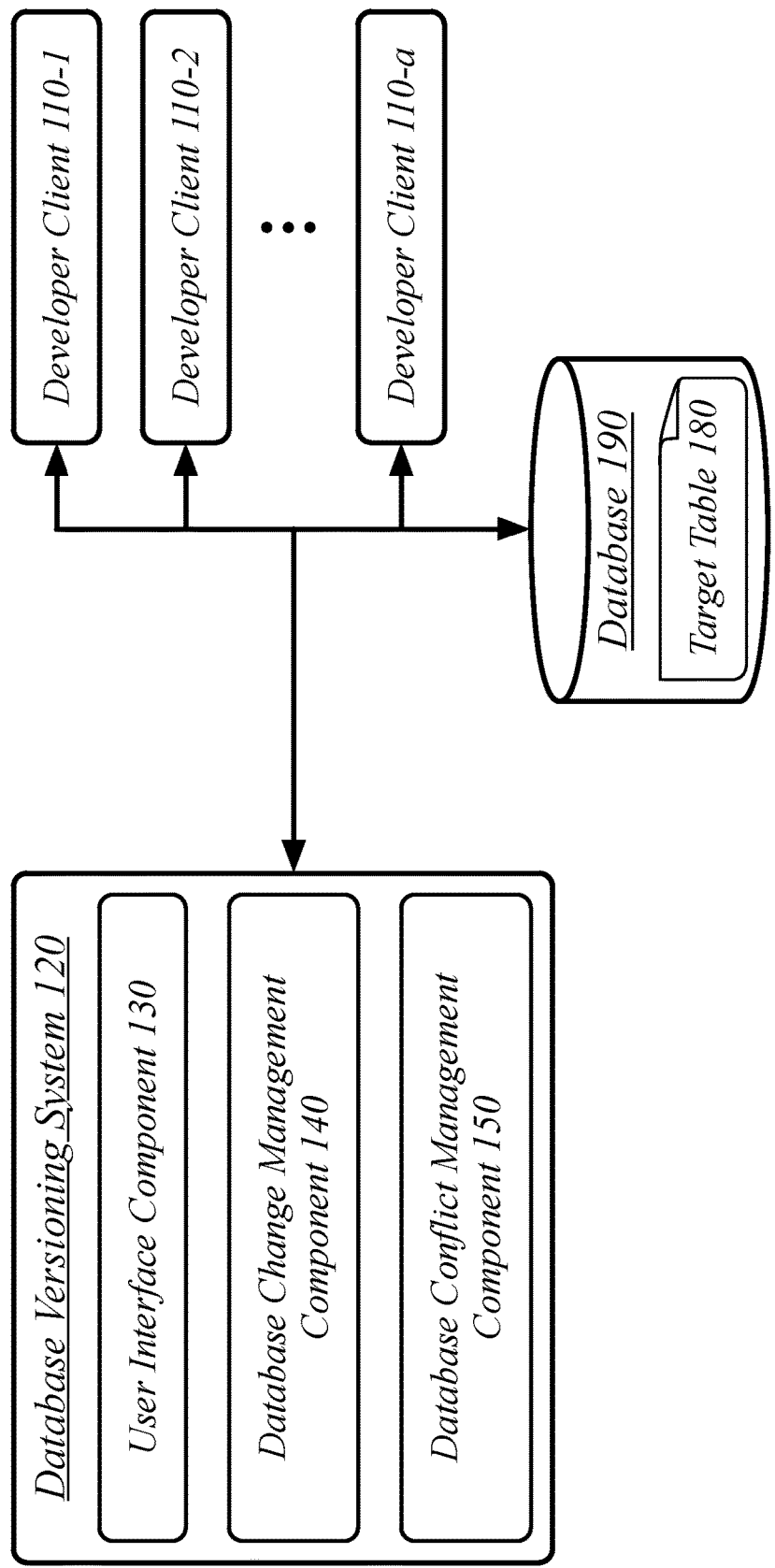
FIG. 1 illustrates an embodiment of a database management system.

Machine learning systems analyze data sets to generate machine learning models. The data sets are curated—elements added, removed, or modified—to modify the machine learning models being generated. Data sets are updated to expand the source of knowledge of the machine learning system, to test alternative configurations of the data sets and therefore the machine learning models, and to generally modify the machine learning models and any operations based on them.

Developers may experiment with their data sets to test whether the machine learning models generated are improved. A data set is added to, removed from, or otherwise modified to produce a developer data set. In some cases, developers may want to undo a change to the data set: they may prefer the operation of the machine learning model before the change. As such, versioning for machine learning data sets may be beneficial. Further, multiple developers may experiment with a shared data set used for a collectively-developed machine learning model. Multiple developers may create their own experimental developer data sets to test out modifications to the data set. As such, versioning for machine learning data sets may be particularly beneficial where it supports detecting and managing conflicts between different developers.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a database management database management system 100. In one embodiment, the database management database management system 100 may comprise a computer-implemented system having software applications comprising one or more components. Although the database management database management system 100 shown in FIG. 1 has a limited number of elements in a certain topology, it may be appreciated that the database management database management system 100 may include more or less elements in alternate topologies as desired for a given implementation.

The database management system 100 is generally arranged to aid developers in the maintenance of a database 190. The database management system 100 provides version control and conflict management for its users. A plurality of developers may use a database 190 to maintain a machine learning data set stored in a target table 180 of the database 190. The developers use developer clients 110 to access the target table 180 to generate machine learning models based on the target table 180. The developer clients 110 may comprise computer devices executing software development tools.

A database versioning system 120 supports a plurality of developer clients 110 in their use of the database 190. The database versioning system 120 empowers the developers to use developer clients 110 to generate developer tables based on the target table 180 that they may modify to try to improve the performance of the machine learning models. The developers use the developer clients 110 to test the developer tables to determine whether their modifications improve the performance of the machine learning models. If they do, they may integrate the developer tables back into the target table 180.

The database versioning system 120 is generally arranged to provide version control and conflict detection for the developer clients 110 in their use of the database 190. The database versioning system 120 comprises a plurality of components. It will be appreciated that in various embodiments the operations of the database versioning system 120 may be divided between a different set of components.

A user interface component 130 of the database versioning system 120 provides user interface information for the developer clients 110 in using the database versioning system 120. In some embodiments, the user interface component 130 may generate web pages for viewing on the developer clients 110, the web pages comprising database versioning information for the database 190. Specifically, the user interface component 130 may generate web pages and respond to web-page instructions from the developer clients 110 to perform versioning: generating experimental developer tables, providing change information for the developer tables, providing conflict information for the developer tables, and generally providing information and receiving developer instructions for database versioning operations. As such, the user interface component 130 may use web pages, web content, and web controls to provide a user interface for the database versioning system 120 to the developers using the developer clients 110. It will be appreciated, however, that in other embodiments other techniques may be used. The user interface component 130 may implement various security techniques to ensure that the database versioning system 120 and database management system 100 as a whole operates securely.

A database change management component 140 of the database versioning system 120 is generally arranged to detect and track changes to the database 190 on behalf of the developer clients 110. The database change management component 140 determines the changes between a developer table and a target table 180 and provides change information to the user interface component 130 to provider to developers on the developer clients 110. The database change management component 140 is further operative to apply changes to the target table 180 when requested by a developer.

A database conflict management component 150 of the database versioning system 120 is generally arranged to detect and track conflicts to the database 190 on behalf of the developer clients 110. The database conflict management component 150 determines the conflicts between a developer tables and a target table 180 and provides conflict information to the user interface component 130 to provide to developers on the developer clients 110.

Figure 2:
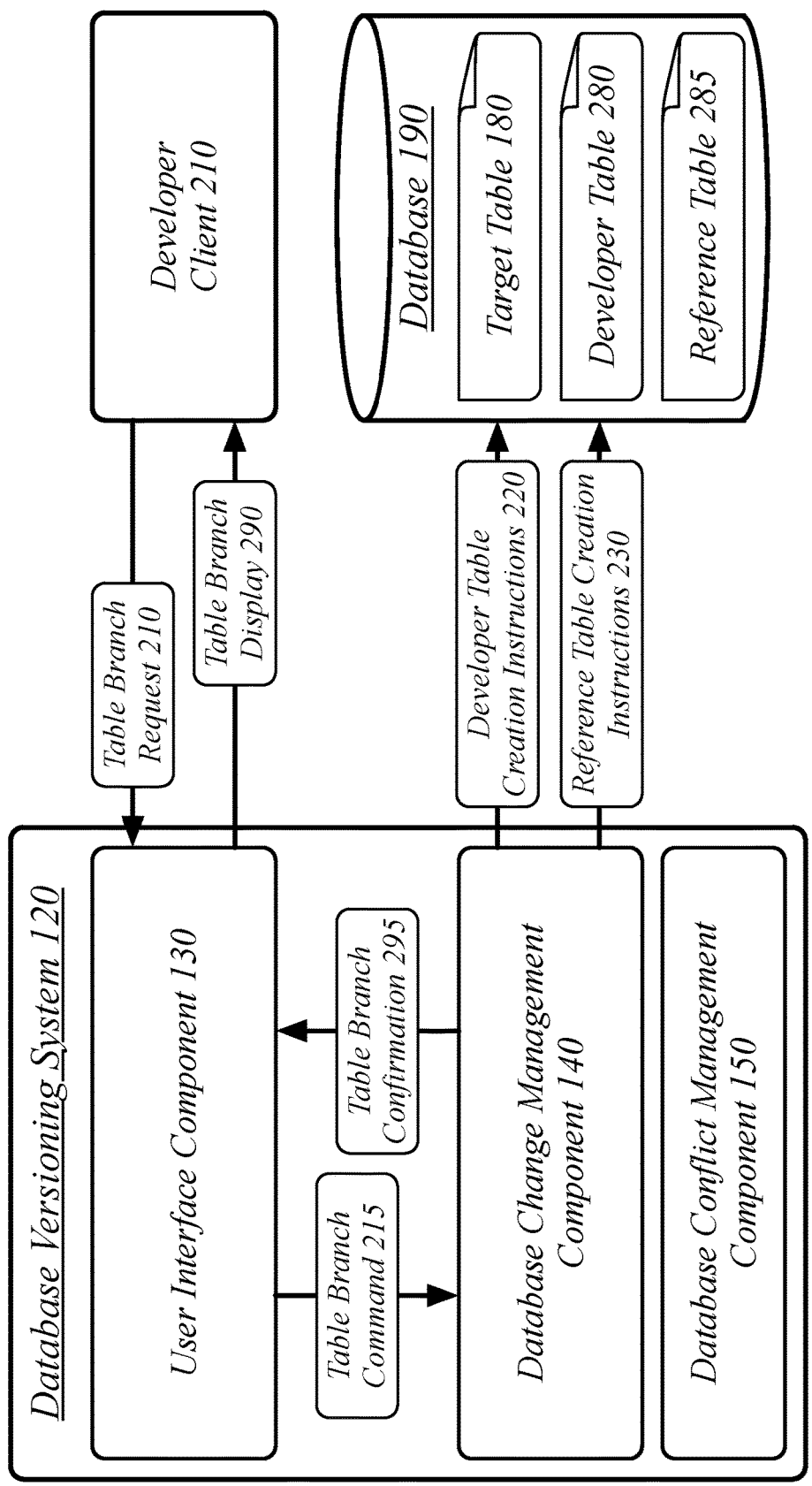
FIG. 2 illustrates an embodiment of the database management system implementing a database table branch.

FIG. 2 illustrates an embodiment of the database management system 100 implementing a database table branch.

A developer may use a developer client 210 to perform a table branch request 210 with the database versioning system 120. The developer client 210 may correspond to the developer clients 110 discussed with reference to FIG. 1. The table branch request 210 identifies a target table 180 stored in the database 190 and requests that a developer table 280 be created in the database 190 allowing temporary changes to be made by the developer to the data set represented in the target table 180 without modifying the target table 180 itself. This empowers the developer to use the developer table 280 to perform test modifications of the target table 180 and experiment with the results without changing the source target table 180. The target table 180 may be shared between multiple developers.

The use of a developer-specific developer table 280 therefore allows the developer to test changes to the target table 180 without impacting the use of the target table 180 for other developers. The developer table 280 may be used, without limitation, to generate machine learning models based on the data set stored in the developer table 280. The developer may use the developer client 210 to test the machine learning models to determine whether changes to the target table 180 represented in the developer table 280 improve the performance of the machine learning models as compared to the machine learning models generated from the base target table 180.

The developer client 210 sends a table branch request 210 to the database versioning system 120 using the user interface component 130. The table branch request 210 may be generated by a user selection of a table branch request control on a web page provided by the user interface component 130 for versioning of the database 190. The user interface component 130 receives the table branch request 210 and activates operations of the database versioning system 120 to respond to the table branch request 210 using a table branch command 215. The user interface component 130 may verify that the developer client 210 is authorized to access the database 190 and specifically authorized to access the target table 180 before performing the table branch command 215 with the database change management component 140.

The user interface component 130 provides a table branch command 215 to the database change management component 140. The table branch command 215 specifies a target table 180 to be branched and a developer for whom to branch the target table 180. The database change management component 140 branches the target table 180 to allow development of a developer version based on the table branch command 215 received from the user interface component 130 in response to the table branch request 210.

The database change management component 140 executes developer table creations instructions 220 against the database 190 to generate the developer table 280 based on the target table 180. The database change management component 140 further executes reference table creation instructions 230 to generate a reference table 285. The developer table 280 is used to store temporary or developer-specific changes to the target table 180 made by the developer using the developer client 210. The reference table 285 is used to store a reference of the state of the target table 180 at the time of the branch with the target table 180. The reference table 285 is used with the developer table 280 to determine the changes made specifically by the developer since the time of the branch, independent of any changes that may be made to the target table 180 (such as by other developers) after the branch. The developer table creation instructions 220 and reference table creation instructions 230 may comprise SQL instructions, MySQL instructions, or any other database instructions.

The table branch request 210 may specify a branch mode for the requested branch, the branch mode one of a plurality of branch modes. The database versioning system 120 may specifically support three branch modes: a full-table branch mode, a partial-table branch mode, and an addition-only branch mode. The branch mode is then reflected in the table branch command 215 provided to the database change management component 140. The branch mode may be specified in a web control provided as part of a web page used as the user interface of the user interface component 130.

The full-table branch mode specifies that the full target table 180 may be used and modified in the development of the developer machine learning model. The full-table branch mode indicates that a full copy of the target table 180 should be made so as to empower the developer to modify any part of their branch of the target table 180 and to generate a machine learning model based on any part of their branch of the target table 180. When the database change management component 140 receive a table branch command 215 specifying the full-table branch mode it executes developer table creation instructions 220 and reference table creation instructions 230 specific to the full-table branch mode. Full-table branch mode developer table creation instructions 220 instruct the database 190 to make a complete copy of the target table 180 to make the developer table 280. Full-table branch mode reference table creation instructions 230 instruct the database 190 to also make a complete copy of the target table 180 to make the reference table 285. The developer table 280 and reference table 285 being complete copies of the target table 180 empower the development of the developer table 280 with complete independence from any changes made to the target table 180 following the branch.

The partial-table branch mode specifies that only a portion of the target table 180 will be used and modified in the development of the developer machine learning model. The partial-table branch mode indicates that a partial copy of the target table 180 should be made so as to empower the developer to modify that portion of their branch of the target table 180 without using the resources (e.g., storage space and copy time) of a copy of the full table. When the database change management component 140 receive a table branch command 215 specifying the partial-table branch mode it executes developer table creation instructions 220 and reference table creation instructions 230 specific to the partial-table branch mode. Partial-table branch mode developer table creation instructions 220 instruct the database 190 to make a partial copy of the target table 180 to make the developer table 280 based on only a portion of the target table 180. Partial-table branch mode reference table creation instructions 230 instruct the database 190 to similarly make a partial copy of the target table 180 to make the reference table 285 based on only that portion of the target table 180. The developer table 280 and reference table 285 being partial copies of the target table 180 constraints the development of the developer table 280 to the specified portion of the target table 180 following the branch.

The portion of the target table 180 copied for the developer table 280 and reference table 285 may be specified based a database row selection function. The database row selection function may comprise a range of indexed identifiers to be copied. The database row selection function may comprise a database query resolving to a specific set of rows of the target table 180. The reference table 280 may therefore comprise a subset of the target table 180 selected based on a database row selection function. The developer table 280 similarly starts as a subset of the target table 180 selected based on the database row selection function, but it may be modified over time based on developer instructions.

The addition-only branch mode specifies that only additional rows will be added to the developer table 280 in the development of the developer machine learning model. The addition-only branch mode indicates that the reference table 285 does not need to be copied in creating the developer table 280 and reference table 285. When the database change management component 140 receive a table branch command 215 specifying the addition-only branch mode it executes developer table creation instructions 220 and reference table creation instructions 230 specific to the addition-only branch mode. Addition-only branch mode developer table creation instructions 220 instruct the database 190 to create the developer table 280 as an empty table, with additions to the developer table 280 eventually being stored in the initially-empty developer table 280. Addition-only branch mode reference table creation instructions 230 instruct the database 190 to similarly create the reference table 285 as an empty table. Rather than using the reference table 285 to determine changes from the branched target table 180, the changes are the additions stored in the developer table 280. As such, the reference table 285 may comprise an empty table, the developer table 280 dedicated to added developer database rows.

Once the developer table creation instructions 220 and reference table creation instructions 230 are executed the database change management component 140 notifies the user interface component 130 that the table branch has been performed in a table branch confirmation 295 responding to the table branch command 215. The user interface component 130 then provides a table branch display 290 to the developer client 210 in response to the table branch request 210. The table branch display 290 indicates that the table branch request 210 was successfully processed by the database versioning system 120. The table branch display 290 may indicate a current change state of the developer table 280, which initially indicates that no changes have been made as compared to the reference table 285 indicating the stating of the target table 180 at the time of the table branch.

Figure 3:
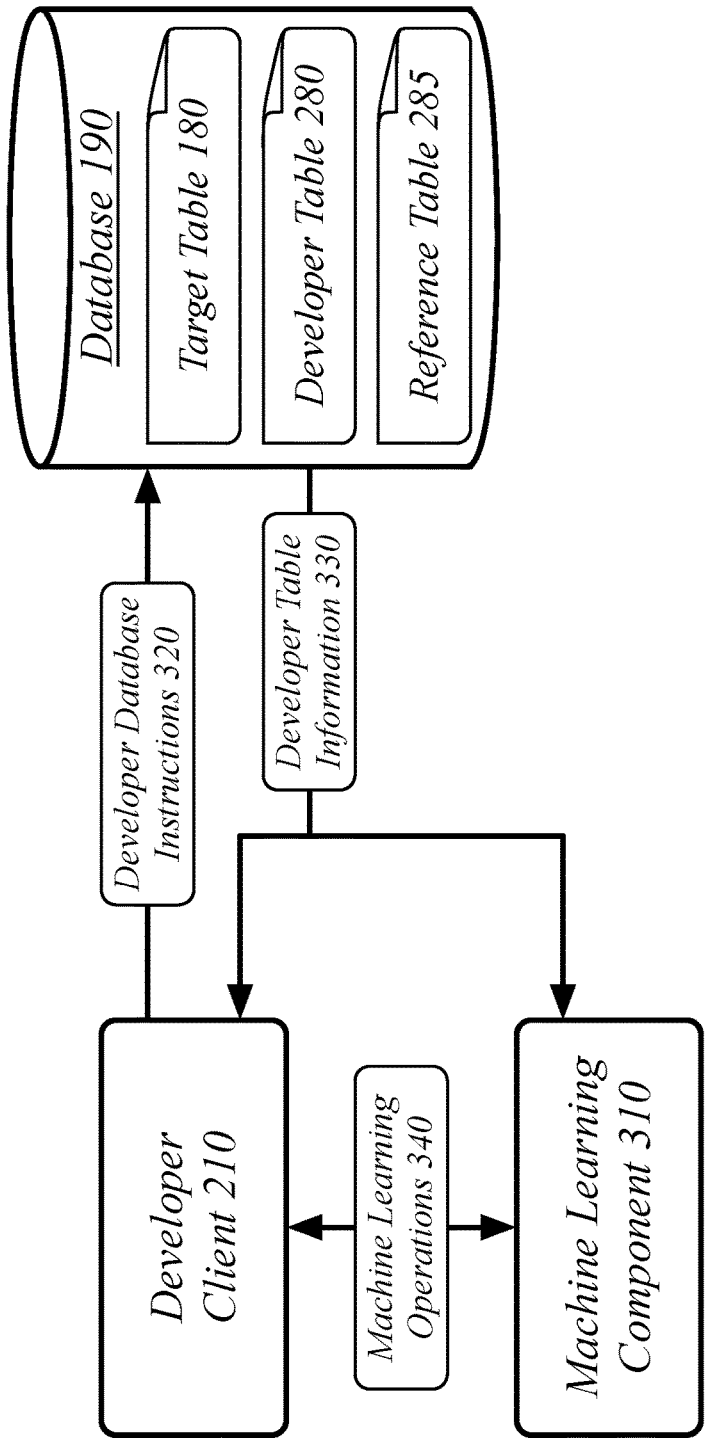
FIG. 3 illustrates an embodiment of the database management system updating a developer table.

FIG. 3 illustrates an embodiment of the database management system 100 updating a developer table 280.

The developer client 210 executes developer database instructions 320 to modify the target table 180. The authorized possible developer database instructions 320 may be defined based on the branch mode. A full-table branch mode may allow any modifications to the developer table 280 by the developer database instructions 320. A partial-table branch mode may only allow modifications to the specified portion of the target table 280 copied for the developer table 280, with modifications to other portions of the developer table 280 prevented. An addition-only table branch may only allow modifications that either add rows to the developer table 280 or modified rows added to the developer table 280 in addition to those in the target table 180 at the time of the table branch.

The developer client 210 may operate with a machine learning component 310. The machine learning component 310 may operate according to known machine learning techniques in machine learning operations 340. The developer client 210 and machine learning component 310 may operate based on developer table information 330 retrieved from the developer table 280 of the database 190. The machine learning operations 340 may comprise the developer client 210 instructing the machine learning component to generate a machine learning model based on a data set represented in the developer table 280 of the database 190. The machine learning operations 340 may comprise testing the generated machine learning model to evaluate the efficacy of the modifications to the target table 180 represented by the developer table 280. In general, the developer database instructions 320, retrieved developer table information 330, and machine learning operations 340 may be used to modify the developer table 280, generating machine learning models based on the developer table 280, and evaluate the machine learning models.

Figure 4:
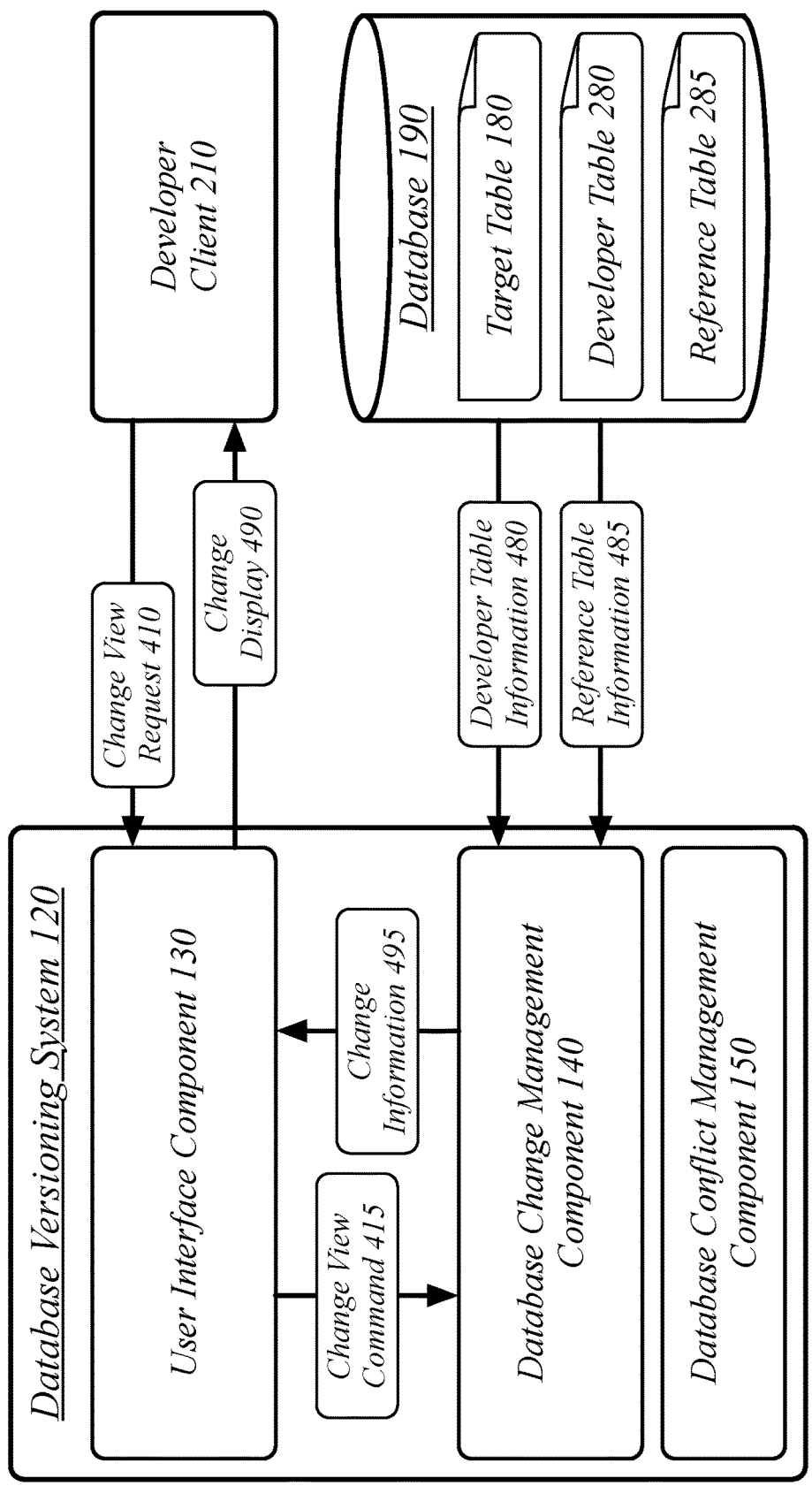
FIG. 4 illustrates an embodiment of the database management system generating a change display.

FIG. 4 illustrates an embodiment of the database management system 100 generating a change display 490.

The user interface component 130 may receive a change view request 410 from the developer client 210. The change view request 410 is associated with a specific developer table 280 and requests that the user interface component 130 provide a change display 490 comprising the changes made to the developer table 280 since the time of the table branch that initially generated the developer table 280. The change view request 410 may be received as a change view web control activation received based on a web page provided to the developer client 210 by the user interface component 130. The user interface component 130 sends a change view command 415 to the database change management component 140.

The database change management component 140 compares the developer table 280 to the reference table 285 to determine a database change set. As both the developer table 280 and the reference table 285 are based on the target table 180, the database change set represents the changes to the developer table 280 performed after the table branch. In some cases, the database change management component 140 may compare the developer table 280 to the reference table 285 to determine the database change set in response to a change view request 410 receive from a developer client 210. The change view request 410 may be received based on a developer, whether the developer of the developer table 280 or a developer viewing the work performed by the developer of the developer table 280, asking to view the changes represented by the developer table 280. In other cases, comparing the developer table 280 to the reference table 285 to determine the database change set may be performed in response to a developer table commit command. A developer table commit command instructs the database versioning system 120 to apply the database change set to the target table 180 to update the target table 180 based on the modifications represented in the developer table 280. The developer change set may be used to perform the application of the modifications.

The database change management component 140 retrieves developer table information 480 of the developer table 280 and reference table information 485 of the reference table 285 to generate the database change set. Comparing the developer table 280 to the reference table 285 to determine a database change set may comprise performing a row-by-row comparison of the developer table 280 to the reference table 285 in which rows of the developer table 280 are compared to corresponding rows of the reference table 285. Corresponding rows of the developer table 280 and reference table 285 are determined according to an index value column of the target table 180, developer table 280, and reference table 285, such that rows with the same value in the target table 180, developer table 280, and reference table 285 are corresponding rows.

Where the developer table 280 differs from the reference table 285 for the corresponding row, the row from the developer table 280 is included in the database change set. Where the developer table 280 matches the reference table 285 for the corresponding row, the row from the developer table 280 is excluded from the database change set. The database change set therefore comprises those rows of the developer table 280 that differ from the corresponding rows from the reference table 285, which therefore contain the changes to the developer table 280 since the time of the branch of the developer table 280 from the target table 180. Each element of the compared rows is compared, with the rows differing if any element differs. However, in some embodiments, some columns may be marked for exclusion from change comparisons and therefore not compared.

The developer table 280 and the reference table 285 may comprise a structured data format column based on the target table 180 comprising the structured data format column. A structured data format column supports entries that are represented as structured data in a structured data object. In some embodiments, any column might comprise structure data objects. However, in other embodiments, only specific identified columns may comprise structured data objects. Comparing structured data objects may be performed differently than comparing other database elements stored in non-structured-data-columns. A structured data format may be used wherein identical data content can be stored in two non-identical structed data objects because the non-data-content portions of the structure data objects differ.

For instance, the structured data format may, without limitation, use attribute-value pairs in which pairs of data elements are listed in which a value data element indicates a data value and an attribute data element indicates an attribute value indicating what field of the structured data object the data value is for. The structured data format may comprise, without limitation, the JSON format or any other object representation format. The use of attribute-value pairs may result in two data objects that have the same set of attribute-value pairs but with those attribute-value pairs in a different order between the two data objects. A naïve bitwise comparison of the two data objects might indicate that they two data objects are distinct. Instead, the database change management component 140 compares the attribute-value pairs—or otherwise compares the data content of the two data objects (one from the developer table 280, one from the reference table 285)—to determine if the data objects are different and therefore represent a change from the reference table 285 to the developer table 280.

As such, performing the row-by-row comparison of the developer table 280 to the reference table 285 may comprise a plurality of steps performed by the database change management component 140. The database change management component 140 may retrieve a first structured data object from the developer table 280 and a second structured data object from the reference table 285. The database change management component 140 compares one or more first data values from the first structured data object to one or more second data values from the second structured data object. The database change management component 140 includes a database row comprising the first structured data object in the database change set where one or more of the first data values from the first structured data object differ from one or more of the second data values from the second structured data object, as this difference indicates that the data content of the first structured data object is different than the data content of the second structured data object. The database change management component 140 excludes the database row comprising the first structured data object from the database change set where the one or more first data values from the first structured data object all match the one or more second data values from the second structured data object. As such, a row comprising a developer structured data object from the developer table 280 is included where and only where the comparison of the developer structured data object to the reference structured data object from the reference table 285 indicates that the data content of the developer and reference structured database objects differs.

The database conflict management component 140 generates the database change set and provides the database change set to the user interface component 130 as part of change information 495. The change information 495 is presented to the developer client 210 by the user interface component 130 in a change display 490. The change display 490 represents the database change set to the developer in a human-readable format. The change display 490 may comprise the database rows of the database change set listed as a table in a web page.

Figure 5:
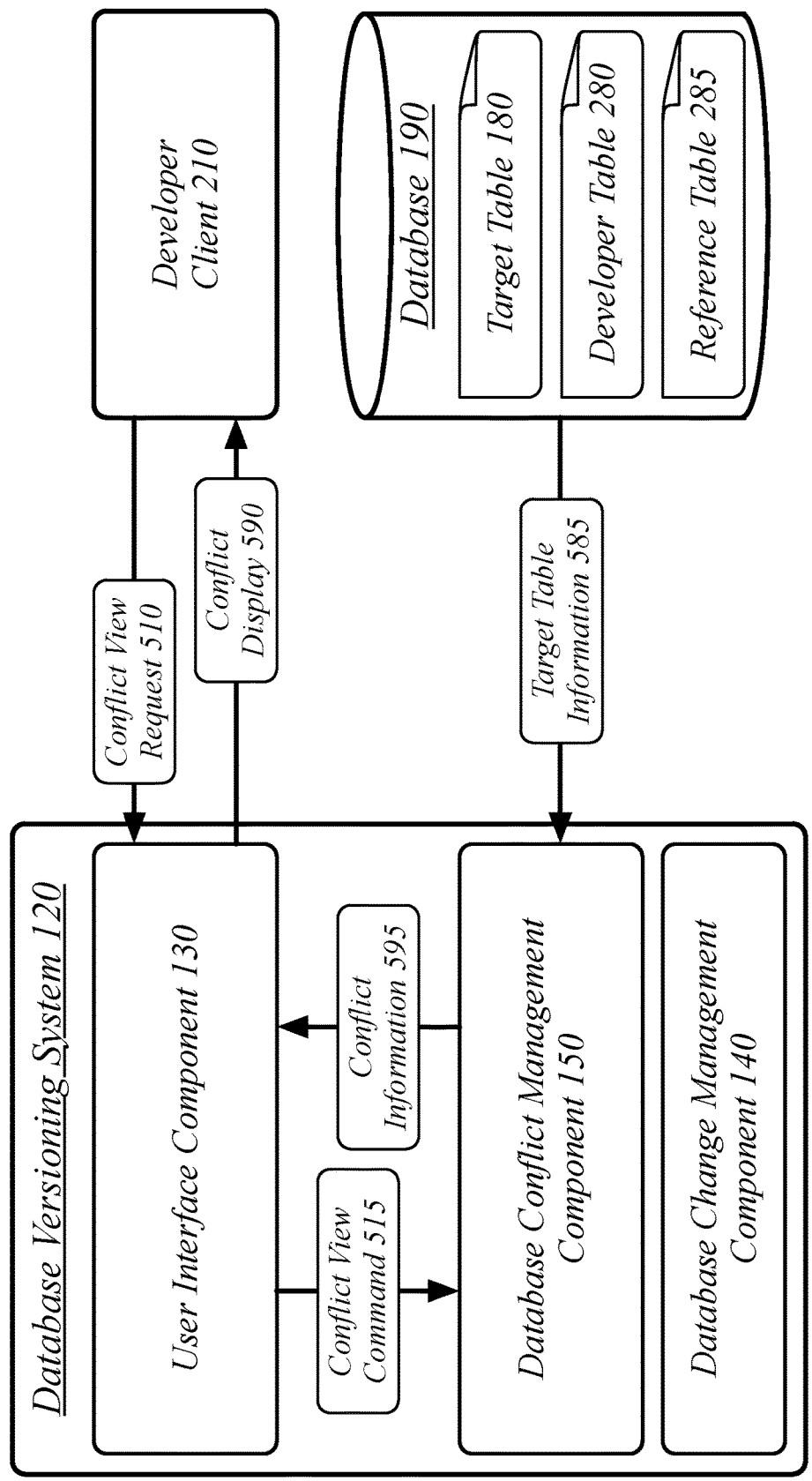
FIG. 5 illustrates an embodiment of the database management system generating a conflict display.

FIG. 5 illustrates an embodiment of the database management system 100 generating a conflict display 590.

A developer may request that their changes land against—be applied to—the target table 180 so that the modifications they made to the target table 180 in their experimental branch—the developer table 280—become available in the target table 180 to others. Once the developer changes from the developer table 280 are landed, the updated target table 180 based on the developer table 280 is available to other developers, such as for the generation of models based on the updated target table 180, for inclusion in their own improvements to and experimental with the target table 180, or for any other purpose. To land the changes, the database versioning system 120 uses the developer table 280 (comprising developer changes to the original target table 180) and the reference table 285 (representing the state of the target table 180 at the time the developer table 280 branch was created) to update the target table 180 to include the changes in the developer table 280. Each change in the developer table 280 is landed row-by-row, and may be applied in an atomic operation to avoid the target table 180 being modified by any other operation during the landing process.

The user interface component 130 may receive a conflict view request 510 from the developer client 210. The change view request 410 is associated with a specific developer table 280 and requests that the user interface component 130 provide a conflict display 590 comprising any conflicts between the developer table 280 and the target table 180. The conflict view request 510 may be received as a conflict view web control activation received based on a web page provided to the developer client 210 by the user interface component 130. The user interface component 130 sends a conflict view command 515 to the database conflict management component 150.

The database conflict management component 150 compares the developer table 280 to the reference table 285 to determine a database change set as described with reference to FIG. 4. This database change set is then used to generate a conflicting change set. The conflicting change set represents the changes to the developer table 280 performed after the table branch that conflict with changes made to the target table 180 after the table branch. This may represent changes made to the target table 180 by other developers using the database management system 100. In some cases, the database conflict management component 140 may compare the developer table 280 to the target table 180 to determine the conflicting change set in response to a conflict view request 510 receive from a developer client 210. The conflict view request 510 may be received based on a developer, whether the developer of the developer table 280 or a developer viewing the work performed by the developer of the developer table 280, asking to view the conflicts with the target table 180 represented by the developer table 280. In other cases, comparing the developer table 280 to the target table 180 to determine the conflicting change set may be performed in response to a developer table commit command. The conflicting change set may be used to determine whether to perform the application of the modifications. In some embodiments, the modifications may only be applied where the conflicting change set is empty. In other embodiments, the modifications may only be applied where either the conflicting change set is empty or the developer approves the application of conflicting changes.

The database conflict management component 150 compares the database change set to the target table 180 to determine a conflicting change set. The database conflict management component 150 retrieves target table information 585 about the target table 180 to determine the conflicting change set. The conflict change set represents any conflicts between the changes made to the developer table 280 since it was branched from the target table 180 and the target table 180 as it currently stands. It represents changes made to each of the target table 180 and the developer table 280 since they branched from each other that conflict, that modify the same portion of the respective tables 180, 280.

Comparing the database change set to the target table 180 to determine the conflicting change set involves a row-by-row comparison of the database change set to the corresponding rows, if any, of the target table 180. Rows in the database change set may not have a corresponding row in the target table 180 where they are an addition in the developer table 280 or were removed from the target table 180 following the branching of the developer table 280. The database conflict management component 150 determines for each row of the database change set whether a last-modified timestamp for each corresponding row of the target table 180 is more recent than a development branch time for the developer table. Each row of the target table 180 comprises a last-modified timestamp that is automatically updated whenever that row of the target table 180 is modified to indicate the time of modification. Where this last-modified timestamp is more recent than the development branch time—the time at which the development table 280 was branched—the row of the target table 180 was modified more recently than the developer table 280 and therefore has changes with which the database change set conflicts.

In some cases, the target table 180 have one or more columns specified as non-version-controlled columns. Non-version-controlled columns are not tracked as part of tracking changes or detecting conflicts. Non-version-controlled columns may be specified on the basis that they contain automatically-generated data based on other columns of the target table 180. The non-version-controlled columns may include a last-modified-timestamp column comprising the last-modified timestamp for each row. Comparing the database change set to the target table 180 to determine the conflicting change set may therefore exclude one or more non-version-controlled columns of the target table 180, with those one or more non-version-controlled columns of the target table 180 comprising metadata based on one or more version-controlled columns of the target table 180.

The user interface component 130 is provided conflict information 595 from the database conflict management component 150. The conflict information 595 comprises the conflicting change set. The user interface component 130 displays the conflicting change set where the conflicting change set comprises one or more conflicting changes. That is, if the conflicting change set is non-empty, then the one or more conflicting changes in the non-empty conflicting change set are displayed to the developer in a conflict display 590. The conflict display 590 represents the conflicting change set to the developer in a human-readable format. The conflict display 590 may comprise the database rows of the conflicting change set listed as a table in a web page. Alternatively, the user interface component 130 indicates a conflict-free change set where the conflicting change set is empty in the conflict display 590. The change set is empty when none of the changes to the developer table 280 conflict with any changes to the target table 180.

Where the conflict information 595 and the conflicting change set is generated in response to a developer table commit command the database versioning system 120 may only commit the changes of the developer table 280 where the conflicting change set is empty. The user interface component 130 may display the conflicting change set in association with a database table commit rejection where the conflicting change set comprises one or more conflicting changes. The database table commit rejection may be represented in the conflict display 590 in association with a display of the conflicting changes. In contrast, the database conflict management component 150 applies the database change set and indicates the conflict-free change set where the conflicting change set is empty.

The database change set comprises a plurality of change rows, wherein each change row comprises the current state of a row in the developer table 280 that differs from how that row was in target table 180 at the time the developer table 280 was branched from the target table 180. Applying the database change set therefore comprises applying each of the change rows to the target table 180 to make the target table 180 match the developer table 280. Each change row is considered in turn. Where a change row indicates a row addition of an added row, the added row is added to the target table 180. Where a change row indicates a row deletion, the indicated row is deleted from the target table 180. Where a change row indicates a row modification, the indicated modifications to the target table 180 are applied to the associated row in the target table 180. As a result, the database change set is iterated across so that the changes represented in the database change set land in the target table 180.

In some embodiments, the database 190 may comprise a master/slave distributed database system. A master/slave distributed database system comprises a plurality of database server devices storing the database 190. The division of server devices into master and slave provides for data replication. However, as the database change set should be applied as an atomic operation, the master/slave system may be locked during the modifications to ensure consistency. As such, applying the database change set may comprise locking the target table 180 with the master/slave distributed database system such that no other process can modify the target table 180. The database change management component 140 then modifies the target table 180 in the master/slave distributed database system based on the database change set, applying each of the database changes of the database change set to the target table 180 on the master devices, which then distributes the changes to the slave devices. Once the database change set is applied to the target table 180, the database change management component 140 unlocks the target table 180 in the master/slave distributed database system.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may compare a developer table to a reference table to determine a database change set, wherein both the developer table and the reference table are based on a target table at block 602.

The logic flow 600 may compare the database change set to the target table to determine a conflicting change set at block 604.

The logic flow 600 may display the conflicting change set where the conflicting change set comprises one or more conflicting changes at block 606.

The logic flow 600 may indicate a conflict-free change set where the conflicting change set is empty at block 608.

The embodiments are not limited to this example.

Figure 7:
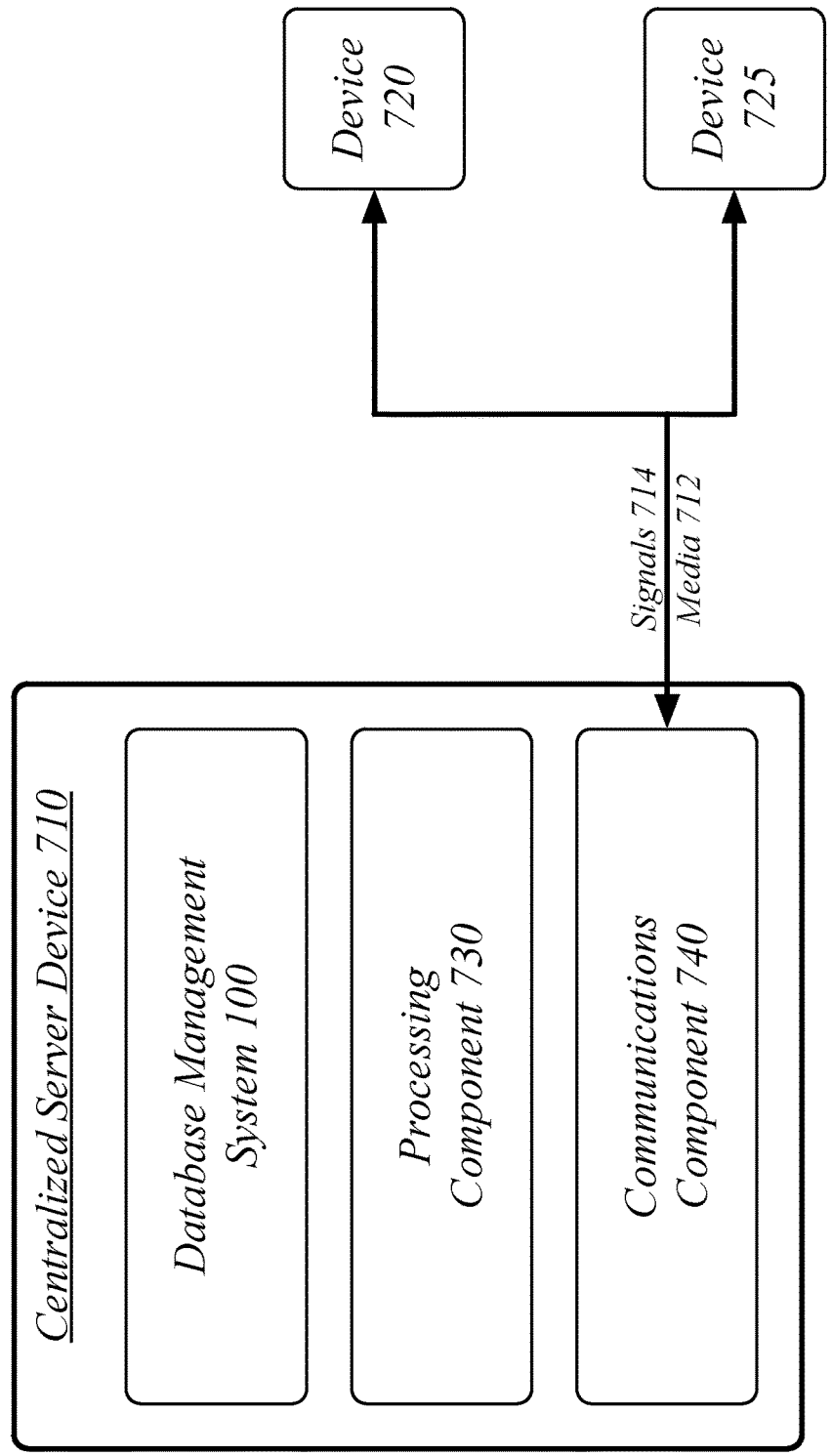
FIG. 7 illustrates an embodiment of a centralized system for the system of FIG. 1.

FIG. 7 illustrates a block diagram of a centralized system 700. The centralized system 700 may implement some or all of the structure and/or operations for the database management database management system 100 in a single computing entity, such as entirely within a single centralized server device 710.

The centralized server device 710 may comprise any electronic device capable of receiving, processing, and sending information for the database management database management system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 710 may execute processing operations or logic for the database management database management system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 710 may execute communications operations or logic for the database management database management system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 710 may communicate with other devices 720, 725 over a communications media 712 using communications signals 714 via the communications component 740. The devices 720, 725 may be internal or external to the centralized server device 710 as desired for a given implementation. The centralized server device 710 may execute the database management system 100, including the database versioning system 120, database 190, and machine learning component 310. The devices 720, 725 may execute developer clients, such as developer clients 110 and 210.

Figure 8:
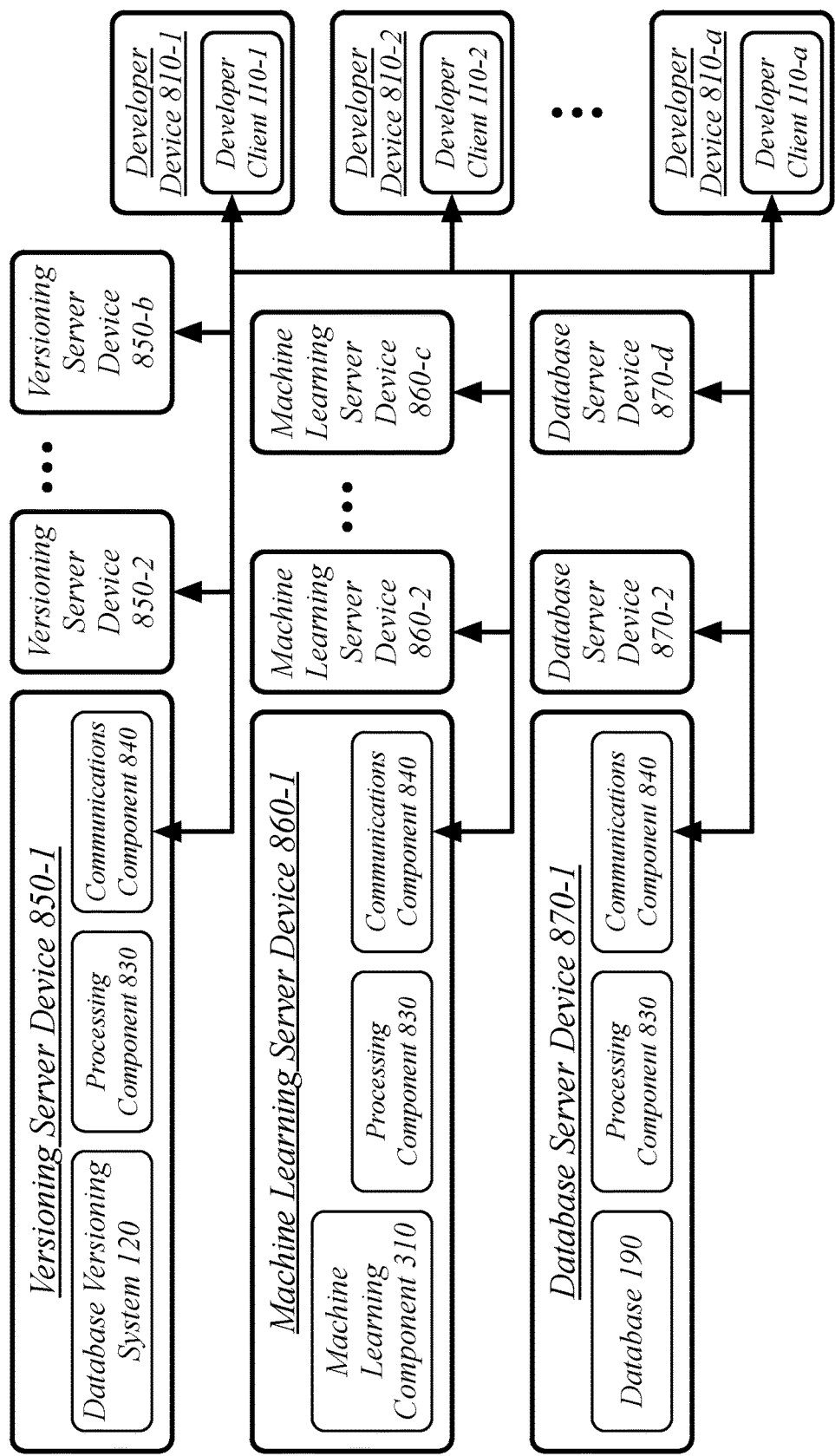
FIG. 8 illustrates an embodiment of a distributed system for the system of FIG. 1.

FIG. 8 illustrates a block diagram of a distributed system 800. The distributed system 800 may distribute portions of the structure and/or operations for the database management database management system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of server devices 850, 860, 870. In general, the server devices 850, 860, 870 may be the same or similar to the centralized server device 710 as described with reference to FIG. 7. For instance, the server devices 850, 860, 870 may each comprise a processing component 830 and a communications component 840 which are the same or similar to the processing component 730 and the communications component 740, respectively, as described with reference to FIG. 7. In another example, the server devices 850, 860, 870 may communicate over a communications media 812 using communications signals 814 via the communications components 840.

The distributed system 800 may support a plurality of developer devices 810, each executing one of the developer clients 110, with which it communicates via the communications signals 814. The distributed system 800 may comprise a plurality of versioning server devices 850. The versioning server devices 850 may execute the database versioning system 120 across the plurality of versioning server devices 850 providing database versioning for the developer clients 110. The distributed system 800 may comprise a plurality of machine learning server devices 860. The machine learning server devices 860 may execute a plurality of machine learning component 310 used by the developer clients 110 for machine learning processes. The distributed system 800 may comprise a plurality of database server devices 870. The database server devices 870 may execute the database 190 as a distributed database 190 across the plurality of database server devices 870.

Figure 9:
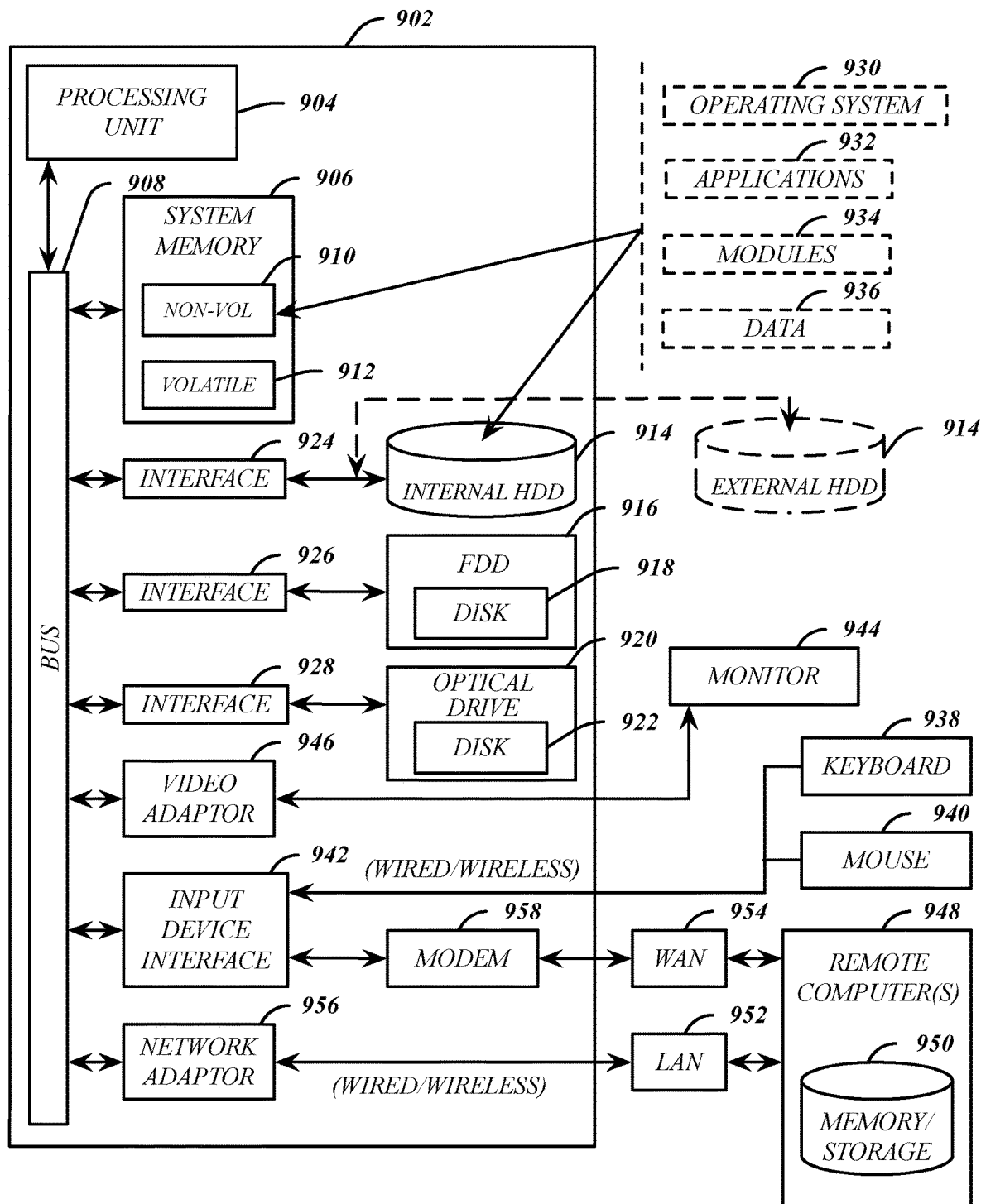
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 7, 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the database management database management system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
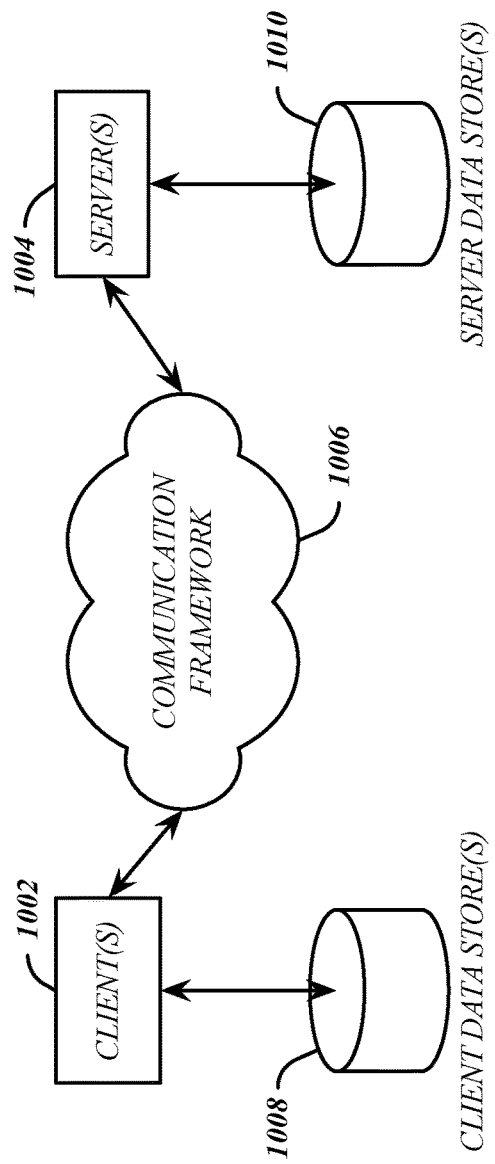
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may correspond to the developer clients 110. The servers 1004 may correspond to server devices 710, 850, 860, 870. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
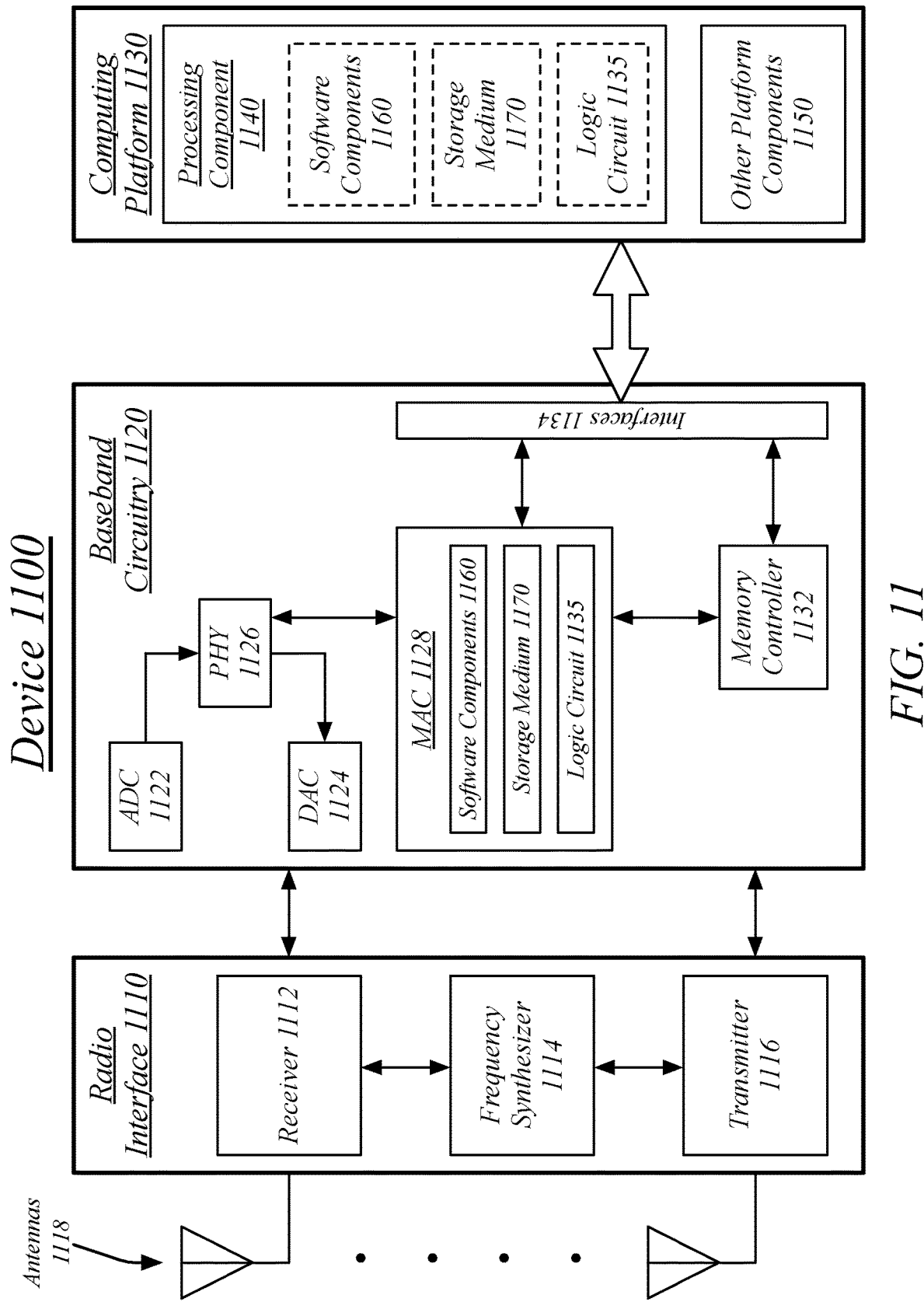
FIG. 11 illustrates an embodiment of a radio device architecture.

FIG. 11 illustrates an embodiment of a device 1100 for use in a multicarrier OFDM system, such as the database management database management system 100. Device 1100 may implement, for example, software components 1160 as described with reference to database management database management system 100 and/or a logic circuit 1135. The logic circuit 1135 may include physical circuits to perform operations described for the database management database management system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the database management database management system 100 and/or logic circuit 1135 in a single computing entity, such as entirely within a single device. Alternatively, the device 1100 may distribute portions of the structure and/or operations for the database management database management system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the database management database management system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
   comparing a developer table to a reference table to determine a database change set, wherein both the developer table and the reference table are based on a target table;
   comparing the database change set to the target table to determine a conflicting change set;
   displaying the conflicting change set where the conflicting change set comprises one or more conflicting changes; and indicating a conflict-free change set where the conflicting change set is empty,
wherein the developer table stores at least temporary or developer-specific changes to the target table made by a developer, and
wherein the reference table stores at least a reference of a state of the target table at a time of a table branch.

2. The method of claim 1, further comprising:
comparing the developer table to the reference table to determine the database change set in response to a developer table commit command.

3. The method of claim 2, further comprising:
displaying the conflicting change set in association with a database table commit rejection where the conflicting change set comprises one or more conflicting changes; and
applying the database change set and indicating the conflict-free change set where the conflicting change set is empty.

4. The method of claim 1, wherein comparing the developer table to the reference table to determine a database change set comprises:
performing a row-by-row comparison of the developer table to the reference table.

5. The method of claim 4, wherein the developer table and the reference table comprise a structured data format column, wherein performing the row-by-row comparison of the developer table to the reference table comprises:
retrieving a first structured data object from the developer table and a second structured data object from the reference table;
comparing one or more first data values from the first structured data object to one or more second data values from the second structured data object; and
including a database row comprising the first structured data object where one or more of the first data values from the first structured data object differ from one or more of the second data values from the second structured data object.

6. The method of claim 1, wherein comparing the database change set to the target table to determine the conflicting change set comprises:
determining for each row of the database change set whether a last-modified timestamp for each corresponding row of the target table is more recent than a development branch time for the developer table.

7. The method of claim 1, the reference table comprising a subset of the target table selected based on a database row selection function.

8. The method of claim 1, the reference table comprising an empty table, the developer table dedicated to added developer database rows.

9. An apparatus, comprising:
a database change management component operative to compare a developer table to a reference table to determine a database change set, wherein both the developer table and the reference table are based on a target table;
a database conflict management component operative to compare the database change set to the target table to determine a conflicting change set; and
a user interface component operative to display the conflicting change set where the conflicting change set comprises one or more conflicting changes; and indicate a conflict-free change set where the conflicting change set is empty,
wherein the developer table stores at least temporary or developer-specific changes to the target table made by a developer, and
wherein the reference table stores at least a reference of a state of the target table at a time of a table branch.

10. The apparatus of claim 9, further comprising:
the database change management component operative to compare the developer table to the reference table to determine the database change set in response to a developer table commit command; and apply the database change set and indicating the conflict-free change set where the conflicting change set is empty; and
the user interface component operative to display the conflicting change set in association with a database table commit rejection where the conflicting change set comprises one or more conflicting changes.

11. The apparatus of claim 9, wherein the developer table and the reference table comprise a structured data format column, wherein comparing the developer table to the reference table to determine a database change set further comprises:
the database change management component operative to perform a row-by-row comparison of the developer table to the reference table by: retrieving a first structured data object from the developer table and a second structured data object from the reference table; comparing one or more first data values from the first structured data object to one or more second data values from the second structured data object; and including a database row comprising the first structured data object where one or more of the first data values from the first structured data object differ from one or more of the second data values from the second structured data object.

12. The apparatus of claim 9, wherein comparing the database change set to the target table to determine the conflicting change set comprises:
the database conflict management component operative to determine for each row of the database change set whether a last-modified timestamp for each corresponding row of the target table is more recent than a development branch time for the developer table.

13. The apparatus of claim 9, the reference table comprising a subset of the target table selected based on a database row selection function.

14. The apparatus of claim 9, the reference table comprising an empty table, the developer table dedicated to added developer database rows.

15. At least one computer-readable storage medium comprising instructions that, when executed, cause a system to:
compare a developer table to a reference table to determine a database change set, wherein both the developer table and the reference table are based on a target table;
compare the database change set to the target table to determine a conflicting change set;
display the conflicting change set where the conflicting change set comprises one or more conflicting changes; and
indicate a conflict-free change set where the conflicting change set is empty,
wherein the developer table stores at least temporary or developer-specific changes to the target table made by a developer, and
wherein the reference table stores at least a reference of a state of the target table at a time of a table branch.

16. The computer-readable storage medium of claim 15, comprising further instructions that, when executed, cause a system to:
  compare the developer table to the reference table to determine the database change set in response to a developer table commit command;
  display the conflicting change set in association with a database table commit rejection where the conflicting change set comprises one or more conflicting changes; and
  apply the database change set and indicating the conflict-free change set where the conflicting change set is empty.

17. The computer-readable storage medium of claim 15, wherein the developer table and the reference table comprise a structured data format column, wherein comparing the developer table to the reference table to determine a database change set comprises further instructions that, when executed, cause a system to:
  perform a row-by-row comparison of the developer table to the reference table;
  retrieve a first structured data object from the developer table and a second structured data object from the reference table;
  compare one or more first data values from the first structured data object to one or more second data values from the second structured data object; and
  include a database row comprising the first structured data object where one or more of the first data values from the first structured data object differ from one or more of the second data values from the second structured data object.

18. The computer-readable storage medium of claim 15, wherein comparing the database change set to the target table to determine the conflicting change set comprises further instructions that, when executed, cause a system to:
  determine for each row of the database change set whether a last-modified timestamp for each corresponding row of the target table is more recent than a development branch time for the developer table.

19. The computer-readable storage medium of claim 15, the reference table comprising a subset of the target table selected based on a database row selection function.

20. The computer-readable storage medium of claim 15, the reference table comprising an empty table, the developer table dedicated to added developer database rows.

* * * * *